(12) United States Patent
Chen et al.

(10) Patent No.: US 9,778,776 B2
(45) Date of Patent: Oct. 3, 2017

(54) METHOD AND SYSTEM FOR PROCESSING DATA

(71) Applicants: Beijing Lenovo Software Ltd, Beijing (CN); Lenovo (Beijing) Co., Ltd., Beijing (CN)

(72) Inventors: Ke Chen, Beijing (CN); Rongyao Fu, Beijing (CN); Jinping Yang, Beijing (CN); Haidong Lu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 490 days.

(21) Appl. No.: 13/947,322

(22) Filed: Jul. 22, 2013

(65) Prior Publication Data

US 2014/0028615 A1    Jan. 30, 2014

(30) Foreign Application Priority Data

Jul. 30, 2012  (CN) .......................... 2012 1 0266984
Sep. 28, 2012  (CN) .......................... 2012 1 0371711

(51) Int. Cl.
*G06F 3/041*    (2006.01)
*G06F 3/0487*   (2013.01)
(Continued)

(52) U.S. Cl.
CPC ............ *G06F 3/0416* (2013.01); *G06F 3/044* (2013.01); *G06F 3/0487* (2013.01);
(Continued)

(58) Field of Classification Search
None
See application file for complete search history.

(56) References Cited

U.S. PATENT DOCUMENTS 7,705,586 B2  4/2010  van Zon et al.
7,958,782 B2  6/2011  Phan Le
(Continued)

FOREIGN PATENT DOCUMENTS

AU    2012201722 A1    4/2012
CN     101065721 A    10/2007
(Continued)

OTHER PUBLICATIONS

First Chinese Office Action regarding Application No. 201210266984.9 dated Dec. 4, 2015. English translation provided by Unitalen Attorneys at Law.
(Continued)

*Primary Examiner* — Jennifer Mehmood
*Assistant Examiner* — Carl Adams
(74) *Attorney, Agent, or Firm* — Harness, Dickey & Pierce, P.L.C.

(57) ABSTRACT

A method and system for processing data is provided. The method for processing data includes: generating, by a touch module of a first electronic device, touch information of the first electronic device, in the case that the first electronic device is in contact with a second electronic device; and determining, by the second electronic device, related information of the first electronic device, according to the touch information of the first electronic device. In the solution, the first electronic device generates the related information via the touch module and the second electronic device determines the related information, so as to improve user experience.

25 Claims, 9 Drawing Sheets generate, by a touch module of a first electronic device, touch information of the first electronic device, in the case that the first electronic device is in contact with a second electronic device   ⁓ S101 determine, by the second electronic device, related information of the first electronic device, according to the touch information of the first electronic device   ⁓ S102

(51) Int. Cl.
*G06F 3/044* (2006.01)
*H04W 4/02* (2009.01)
*H04W 4/20* (2009.01)
*H04M 1/725* (2006.01)

(52) U.S. Cl.
CPC ......... *H04M 1/7253* (2013.01); *H04W 4/023* (2013.01); *H04W 4/206* (2013.01); *G06F 3/041* (2013.01); *H04M 2250/22* (2013.01)

(56) References Cited

U.S. PATENT DOCUMENTS

| | | | |
|---|---|---|---|
| 8,228,303 | B2 | 7/2012 | Naruse |
| 8,275,412 | B2 | 9/2012 | Alameh et al. |
| 8,346,302 | B2 | 1/2013 | Alameh et al. |
| 8,803,798 | B2 | 8/2014 | Jiang et al. |
| 2004/0100453 | A1* | 5/2004 | Chung .................. G06F 3/045 345/173 |
| 2004/0203381 | A1* | 10/2004 | Cahn .................. H04B 5/0012 455/41.2 |
| 2008/0116885 | A1 | 5/2008 | Van Zon et al. |
| 2008/0184799 | A1 | 8/2008 | Phan Le et al. |
| 2008/0202241 | A1 | 8/2008 | Phan Le |
| 2008/0258722 | A1 | 10/2008 | Zon et al. |
| 2009/0115726 | A1 | 5/2009 | Van Zon et al. |
| 2009/0251339 | A1 | 10/2009 | Naruse |
| 2010/0037167 | A1* | 2/2010 | Son ....................... G06F 3/0486 715/769 |
| 2010/0167783 | A1 | 7/2010 | Alameh et al. |
| 2010/0283727 | A1 | 11/2010 | Jiang et al. |
| 2010/0283731 | A1 | 11/2010 | Grant et al. |
| 2011/0167783 | A1 | 7/2011 | Tanabe et al. |
| 2011/0185036 | A1* | 7/2011 | Lanier .................. G06Q 20/102 709/217 |
| 2011/0304583 | A1 | 12/2011 | Kruglick |
| 2012/0046906 | A1 | 2/2012 | Alameh et al. |
| 2012/0313865 | A1 | 12/2012 | Pearce |
| 2013/0093713 | A1* | 4/2013 | Bose ...................... G01S 5/0072 345/174 |
| 2014/0320400 | A1 | 10/2014 | Jiang et al. |

FOREIGN PATENT DOCUMENTS

| | | |
|---|---|---|
| CN | 101552806 A | 10/2009 |
| CN | 102214039 A | 10/2011 |
| CN | 102273083 A | 12/2011 |
| CN | 102422244 A | 4/2012 |
| CN | 102576268 A | 7/2012 |

OTHER PUBLICATIONS

First Chinese Office Action regarding Application No. 201210371711.0 dated Jan. 20, 2016. English translation provided by Unitalen Attorneys at Law.

* cited by examiner

METHOD AND SYSTEM FOR PROCESSING DATA

This application claims the priorities of Chinese Patent Application No. 201210266984.9, entitled "METHOD AND SYSTEM FOR PROCESSING DATA", filed with the Chinese Patent Office on Jul. 30, 2012; and Chinese Patent Application No. 201210371711.0, entitled "METHOD AND DEVICE FOR IDENTIFYING ORIENTATION", filed with the Chinese Patent Office on Sep. 28, 2012, which are incorporated by reference in their entirety herein.

FIELD OF THE INVENTION

The present invention relates to the field of data processing technique, in particular to a method and system for processing data.

BACKGROUND OF THE INVENTION

With the development of science and technology, various electronic devices continuously enrich and facilitate the life of public. It is some advantages, such as fast, convenient, resource saving, to use an electronic device for processing information. Therefore, the electronic device becomes necessary in people's life and work.

As for the data exchange between the electronic devices, a user often has to employ Bluetooth or wireless communication and so on which requires more complex setting and operation. However, in some applications, the user generally wants a simple data exchange between two electronic devices, so that a first electronic device can sense information related to a second electronic device and then uses the sensed information related to the second electronic device to perform different intelligence operations, such that the user experience is improved.

SUMMARY OF THE INVENTION

In order to solve the above-mentioned technology problem, the embodiments of the invention provide a method and device for processing data to improve the user experience.

According to one aspect of the invention, there is provided a method for processing data, including:

generating, by a touch module of a first electronic device, touch information of the first electronic device, in the case that the first electronic device is in contact with a second electronic device; and determining, by the second electronic device, related information of the first electronic device, according to the touch information of the first electronic device.

Optionally, the touch module may include a discharging layer arranged on a casing of the first electronic device.

Optionally, before the generating, by a touch module of a first electronic device, touch information of the first electronic device, the method may further include: determining the related information of the first electronic device; and the generating, by a touch module of a first electronic device, touch information of the first electronic device may further include: adjusting a current discharging state of the discharging layer to be a discharging state corresponding to the related information to be transmitted, according to a preset mapping relationship between the related information and the discharging state of the discharging layer.

Optionally, the related information of the first electronic device may include a communication identification of the first electronic device.

Optionally, the method for processing data may further include: receiving and displaying shared information transmitted from the second electronic device to the first electronic device according to the communication identification, wherein the shared information is information displayed in a touch control region which corresponds to the first electronic device, and the shared information is sensed by the second electronic device via a capacitive screen; and performing a specific process on the received shared information.

Optionally, the touch module may include at least two conductive contact points wherein the at least two conductive contact points include a first conductive contact point and a second conductive contact point, a first clicking frequency is set for the first conductive contact point, and there is a one-to-one relationship between the first clicking frequency and the first conductive contact point.

Optionally, the generating, by a touch module of a first electronic device, touch information of the first electronic device may include:

generating a first clicking touch signal by using the first conductive contact point, generating a second clicking touch signal by using the second conductive contact point, wherein the first conductive contact point clicks a touch sensing unit of the second electronic device in the first clicking frequency, so as to generate the first clicking touch signal periodically in a first period, and the first period corresponds to the first clicking frequency.

The determining, by the second electronic device, related information of the first electronic device, according to the touch information of the first electronic device may include:

determining, by the second electronic device, relative position information between the first conductive contact point and the second conductive contact point according to the generated first and second clicking touch signals and the first clicking frequency for the first conductive contact point, wherein the relative position information is adapted to indicate a position and orientation of the first electronic device.

Optionally, the generating a second clicking touch signal by using the second conductive contact point may include: generating the second clicking touch signals continuously by using the second conductive contact point.

Optionally, the generating a second clicking touch signal by using the second conductive contact point may include: generating the second clicking touch signals by using the second conductive contact point periodically in a second period, wherein the second period corresponds to a second clicking frequency which is a preset clicking frequency for the second conductive contact point, and the second clicking frequency is different from the first clicking frequency.

Optionally, the first electronic device includes a vibrating apparatus, and the method further includes:

receiving touch control information and the relative position information between the at least two conductive contact points transmitted by the second electronic device;

determining a vibration direction according to the relative position information and the touch control information; and controlling the vibrating apparatus to vibrate according to the determined vibration direction.

Optionally, a clicking frequency is set for the second conductive contact point, which is different from the clicking frequency set for the first conductive contact point, in the case that the distance between the first conductive contact point and the second conductive contact point is smaller than a preset distance.

According to another aspect of the invention, there is provided a system for processing data, including:

a first electronic device having a touch module, wherein the touch module of the first electronic device generates touch information of the first electronic device, in the case that the first electronic device is in contact with a second electronic device; and the second electronic device adapted to determine related information of the first electronic device according to the touch information of the first electronic device.

Optionally, the touch module includes a discharging layer arranged on a casing of the first electronic device.

Optionally, the first electronic device may further include:

a related information determining module adapted to determine the related information of the first electronic device to be transmitted, in the case that the first electronic device is placed on a capacitive screen of the second electronic device; and a discharging state adjusting module adapted to adjust a current discharging state of the discharging layer to be a discharging state corresponding to the related information to be transmitted, according to a preset mapping relationship between the related information and the discharging state of the discharging layer, wherein the second electronic device determines the related information corresponding to the first electronic device according to the discharging state of the first electronic device sensed by the capacitive screen.

Optionally, the first electronic device may further include:

a shared information receiving unit adapted to receive shared information transmitted from the second electronic device to the first electronic device according to a communication identification, wherein the shared information is information displayed in a touch control region which corresponds to the first electronic device and the shared information is sensed by the second electronic device via a capacitive screen;

a shared information displaying unit adapted to display the shared information; and a shared information processing unit adapted to perform a specific process on the received shared information.

Optionally, the discharging state adjusting module may be adapted to adjust the current quantity of charges released by the discharging layer to be the quantity of electric charges corresponding to the related information to be transmitted, according to a preset mapping relationship between the related information and the quantity of electric charges released by the discharging layer.

Optionally, the touch module may include at least two conductive contact points, wherein the at least two conductive contact points include a first conductive contact point and a second conductive contact point, a first clicking frequency is set for the first conductive contact point, and there is a one-to-one relationship between the first clicking frequency and the first conductive contact point.

Optionally, the first electronic device may further include:

a first generating unit adapted to generate a first clicking touch signal by using the first conductive contact point, in the case that the first conductive contact point of the first electronic device is in contact with a touch sensing unit of the second electronic device, wherein the first conductive contact point clicks the touch sensing unit in the first clicking frequency, so as to generate the first clicking touch signals periodically in a first period, and wherein the first period corresponds to the first clicking frequency; and a second generating unit adapted to generate a second clicking touch signal by using the second conductive contact point, in the case that the second conductive contact point of the first electronic device is in contact with the touch sensing unit of the second electronic device, wherein the second electronic device determines relative position information between the first conductive contact point and the second conductive contact point according to the generated first and second clicking touch signals and the first clicking frequency for the first conductive contact point, wherein the relative position information is adapted to indicate a position and orientation of the first electronic device.

Optionally, the second generating unit may be adapted to generate the second clicking touch signals continuously by using the second conductive contact point, in the case that the second conductive contact point of the first electronic device is in contact with the touch sensing unit of the second electronic device.

Optionally, the second generating unit may be adapted to generate the second clicking touch signals by using the second conductive contact point periodically in a second period, in the case that the second conductive contact point of the first electronic device is in contact with the touch sensing unit of the second electronic device, wherein the second period corresponds to a second clicking frequency which is a preset clicking frequency for the second conductive contact point, and the second clicking frequency is different from the first clicking frequency.

Optionally, the first electronic device includes a vibrating apparatus, and the first electronic device may further include:

a receiving unit adapted to receive touch control information and the relative position information between the at least two conductive contact points transmitted by the second electronic device;

a determining unit adapted to determine a vibration direction according to the relative position information and the touch control information; and a first control unit adapted to control the vibrating apparatus to vibrate according to the determined vibration direction.

Optionally, a clicking frequency is set for the second conductive contact point, which is different from the clicking frequency set for the first conductive contact point, in the case that the distance between the first conductive contact point and the second conductive contact point is smaller than a preset distance.

Optionally, the second electronic device includes:

a touch sensing unit adapted to detect whether a clicking touch signal is generated; and a position determining unit adapted to, in the case that the touch sensing unit detects a first clicking touch signal and a second clicking touch signal generated by the at least two conductive contact points of the first electronic device, determine relative position information between the first conductive contact point and the second conductive contact point according to the first clicking touch signal, the second clicking touch signal and the detected first clicking frequency corresponding to the first conductive contact point, wherein the relative position information is adapted to indicate a position and orientation of the first electronic device.

Optionally, the position determining unit may include:

a first acquiring unit adapted to determine first position information corresponding to the first conductive contact point and second position information corresponding to the second conductive contact point, according to the first clicking touch signal and the second clicking touch signal;

a correspondence establishing unit adapted to identify the first conductive contact point according to the first clicking frequency and establish correspondence between the first conductive contact point and the first position information; and a second acquiring unit adapted to determine the relative position information between the first conductive contact point and the second conductive contact point according to the correspondence between the first conductive contact point and the first position information and the second position information, to acquire the position and orientation of the first electronic device.

Optionally, the second electronic device includes:

a transmitting unit adapted to transmit the relative position information between the first conductive contact point and the second conductive contact point to the first electronic device; and a second control unit adapted to, in the case of a preset trigger condition, generate a corresponding control signal according to the determined relative position information between the first conductive contact point and the second conductive contact point, wherein the second electronic device performs a corresponding control instruction according to the control signal.

BRIEF DESCRIPTION OF THE DRAWINGS

The above and other objectives, features and advantages of the present invention will be easier to be understood when read in conjunction with the accompanying drawings and the following description of the embodiments of the present invention. The elements in the accompanying drawings are only for illustrating the principle of the invention. In the accompanying drawings, same or similar reference numerals refer to same or similar features or elements.

DETAILED DESCRIPTION OF THE INVENTION

The embodiments of the present invention will be described as follows in conjunction with the accompany drawings. An element or feature described in an accompanying drawing or embodiment may be combined with an element or feature illustrated in one or more other accompanying drawings or embodiments. It should be noted that the illustration and description of a component or process which is unrelated with the invention and which is known by the skilled in the art are omitted in the accompanying drawings and description for the purposes of clarity.

Figure 1:
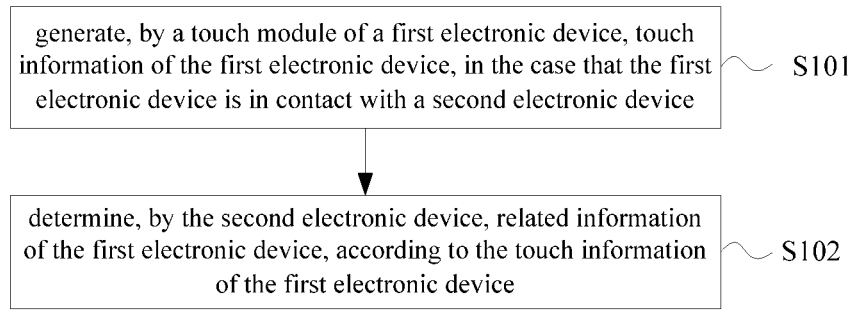
FIG. 1 is a flowchart of a first embodiment of a method for processing data according to the invention.

In one aspect, as shown in FIG. 1, a method for processing data is provided according to an embodiment of the invention. The method includes the following steps S101 to S102.

S101: generating, by a touch module of a first electronic device, touch information of the first electronic device, in the case that the first electronic device is in contact with a second electronic device; and S102: determining, by the second electronic device, related information of the first electronic device, according to the touch information of the first electronic device.

In the following, the method for processing data according to the embodiment of the invention will be described firstly.

It should be noted that the method for processing data according to the embodiment of the invention is applicable to a first electronic device. On a casing of the first electronic device, a discharging layer is arranged. Moreover, the first electronic device operates a data interchange with the second electronic device. The second electronic device has a capacitive screen. Specifically, the first electronic device may be a mobile phone, PAD and so on, on the casing of which the discharging layer is arranged. The discharging layer may be made of, for example, conductive rubber or metal. Moreover, the second electronic device may be a mobile phone, PAD and so on with the capacitive screen.

Figure 2:
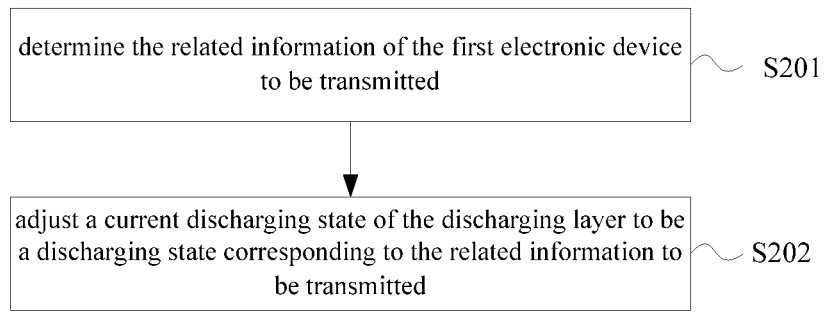
FIG. 2 is a flowchart of a second embodiment of the method for processing data according to the invention.

As shown in FIG. 2, a method for processing data may include the following steps S201 to S202.

S201: determining related information of the first electronic device to be transmitted.

When the first electronic device operates the data interchange with the second electronic device, the first electronic device needs to be placed on the capacitive screen of the second electronic device firstly. When it is sensed that the first electronic device is placed on the capacitive screen of the second electronic device, the first electronic device may determine the information related to the first electronic device to be transmitted and then adjust the discharging state. The information related to the first electronic device may be a type identification, a manufacturer, a communication identification, a physical identification of the first electronic device.

It should be noted that a user determines the related information of the first electronic device to be transmitted from multiple pieces of related information to be selected which are displayed on a display unit of the first electronic device. The determined related information is transmitted to the first electronic device.

S202: adjusting a current discharging state of the discharging layer to be a discharging state corresponding to the related information to be transmitted, according to a preset mapping relationship between the related information and the discharging state of the discharging layer.

After the related information of the first electronic device to be transmitted is determined, the preset mapping relationship between the related information and the discharging state of the discharging layer may be traversed, so as to determine the discharging state corresponding to the related information of the first electronic device to be transmitted, and adjust the current discharging state of the discharging layer of the first electronic device according to the determined discharging state.

When the discharging state of the first electronic device is sensed by the capacitive screen of the second electronic device, the second electronic device traverses the mapping relationship between the related information and the discharging state of the discharging layer, in which the mapping relationship is pre-stored in the second electronic device itself. In this way, the related information corresponding to the sensed discharging state is determined and the related information is used as the related information of the first electronic device.

It should be noted that: different types of related information of the same electronic device correspond to different discharging states; a same type of related information of different electronic devices which has different contents corresponds to different discharging states; and a same type of information related to different electronic devices which has a same content may corresponds to a same discharging state. The discharging state may be the quantity of charges released by the discharging layer. Moreover, the adjustment of the discharging state is to adjust the quantity of charges released by the discharging layer. Of course, the skilled in the art may understand that the discharging state is not limited to the quantity of charges released by the discharging layer and may also be a field strength of the discharging layer and so on, which are all reasonable.

In the technical solution according to the embodiment of the invention, when the first electronic device is placed on the capacitive screen of the second electronic device and the discharging layer is arranged on the casing of the first electronic device, the first electronic device firstly determines the related information of the first electronic device to be transmitted and then adjusts the discharging state of the discharging layer to be the discharging state corresponding to the related information to be transmitted, according to the preset mapping relationship between the related information and the discharging state of the discharging layer, so that the second electronic device determines the related information of the first electronic device according to the discharging state of the first electronic device sensed by the capacitive screen. It can be seen in this solution that the first electronic device transfers the related information by using the discharging state of the discharging layer, and the second electronic device determines the related information by using the electric discharging state sensed by the capacitive screen, so that the data interchange between the electronic devices may be simplified, and the user experience is improved.

In the following, a method for processing data according to an embodiment of the invention will be described, with the type identification of the first electronic device being the related information of the first electronic device. Of course, the related information of the first electronic device is not limited to the type identification of the first electronic device and may also be the manufacturer and the communication identification of the first electronic device. The type identification may be such as Lenovo LePhone S1 and Nokia 5230.

It should be noted that the method for processing data according to the embodiment of the invention is applicable to a first electronic device. On a casing of the first electronic device, a discharging layer is arranged. Moreover, the first electronic device operates a data interchange with the second electronic device. The second electronic device has a capacitive screen. Specifically, the first electronic device may be a mobile phone, PAD and so on, on the casing of which the discharging layer is arranged. The discharging layer may be made of conductive rubber, metal and so on. Moreover, the second electronic device may be a mobile phone, PAD and so on with the capacitive screen.

Figure 3:
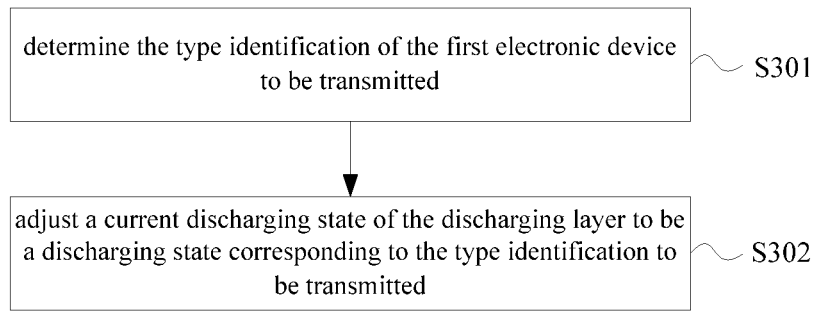
FIG. 3 is a flowchart of a third embodiment of the method for processing data according to the invention.

As shown in FIG. 3, a method for processing data may include the following steps S301 to S302.

S301: determining a type identification of a first electronic device to be transmitted.

When the first electronic device operates the data interchange with the second electronic device, the first electronic device needs to be placed on the capacitive screen of the second electronic device firstly. When it is sensed that the first electronic device is placed on the capacitive screen of the second electronic device, the first electronic device may determine the information related to the first electronic device to be transmitted is the type identification of the first electronic device and then adjust the discharging state.

It should be noted that a user determines the type identification of the first electronic device to be transmitted from multiple pieces of related information to be selected which are displayed on a display unit of the first electronic device and is transmitted to the first electronic device.

S302: adjusting a current discharging state of the discharging layer to be a discharging state corresponding to the type identification to be transmitted, according to a preset mapping relationship between the related information and the discharging state of the discharging layer.

Once it is determine that the related information of the first electronic device to be transmitted is the type identification of the first electronic device, the first electronic device may traverse the preset mapping relationship between the related information and the discharging state of the discharging layer, so as to determine the discharging state corresponding to the type identification of the first electronic device to be transmitted, and adjust the current discharging state of the discharging layer of the first electronic device according to the determined discharging state.

When the discharging state of the first electronic device is sensed by the capacitive screen of the second electronic device, the second electronic device traverses the mapping relationship between the related information and the discharging state of the discharging layer, in which the mapping relationship is pre-stored in the second electronic device itself. In this way, the related information corresponding to the sensed discharging state is determined and the related information is used as the related information of the first electronic device, in which the related information of the first electronic device is the type identification of the first electronic device.

In the technical solution according to the embodiment of the invention, when the first electronic device is placed on the capacitive screen of the second electronic device and the discharging layer is arranged on the casing of the first electronic device, the first electronic device firstly determines the type identification of the first electronic device to be transmitted and then adjusts the discharging state of the discharging layer to be the discharging state corresponding to the type identification to be transmitted, according to the preset mapping relationship between the related information and the discharging state of the discharging layer, so that the second electronic device determines the type identification of the first electronic device according to the discharging state of the first electronic device sensed by the capacitive screen. It can be seen in this solution that the first electronic device transfers the type identification by using the discharging state of the discharging layer, and the second electronic device determines the type identification of the first electronic device by using the electric discharging state sensed by the capacitive screen, so that the data interchange between the electronic devices may be simplified and the user experience is improved.

In the following, a method for processing data according to an embodiment of the invention will be described, with the communication identification of the first electronic device being the related information of the first electronic device. Of course, the related information of the first electronic device is not limited to the communication identification of the first electronic device and may also be the manufacturer, the type identification of the first electronic device.

It should be noted that the method for processing data according to the embodiment of the invention is applicable to a first electronic device. On a casing of the first electronic device, a discharging layer is arranged. Moreover, the first electronic device operates a data interchange with the second electronic device. The second electronic device has a capacitive screen. Specifically, the first electronic device may be a mobile phone, PAD and so on, on the casing of which the discharging layer is arranged. The discharging layer may be made of conductive rubber, metal and so on. Moreover, the second electronic device may be a mobile phone, PAD and so on with the capacitive screen.

Figure 4:
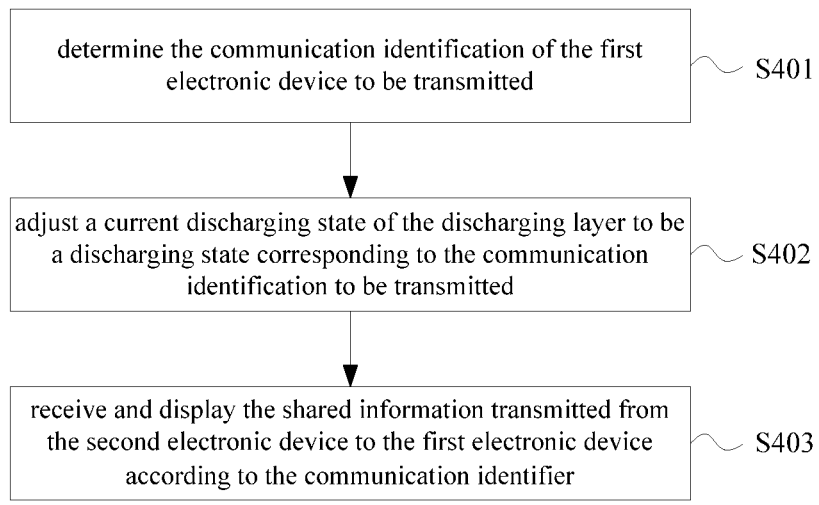
FIG. 4 is a flowchart of a fourth embodiment of the method according for processing data to the invention.

As shown in FIG. 4, a method for processing data may include the following steps S401 to S403.

S401: determining a communication identification of a first electronic device to be transmitted.

When the first electronic device operates the data interchange with the second electronic device, the first electronic device needs to be placed on the capacitive screen of the second electronic device firstly. When it is sensed that the first electronic device is placed on the capacitive screen of the second electronic device, the first electronic device may determine that the information related to the first electronic device to be transmitted is the communication identification of the first electronic device and then adjust the discharging state.

It should be noted that a user determines the communication identification of the first electronic device to be transmitted from multiple pieces of related information to be selected which are displayed on a display unit of the first electronic device and is transmitted to the first electronic device.

S402: adjusting a current discharging state of the discharging layer to be a discharging state corresponding to the communication identification to be transmitted, according to a preset mapping relationship between the related information and the discharging state of the discharging layer.

Once it is determine that the information related to the first electronic device to be transmitted is the communication identification of the first electronic device, the first electronic device may traverse the preset mapping relationship between the related information and the discharging state of the discharging layer, so as to determine the discharging state corresponding to the communication identification of the first electronic device to be transmitted, and adjust the current discharging state of the discharging layer of the first electronic device according to the determined discharging state.

When the discharging state of the first electronic device is sensed by the capacitive screen of the second electronic device, the second electronic device traverses the mapping relationship between the related information and the discharging state of the discharging layer, in which the mapping relationship is pre-stored in the second electronic device itself. In this way, the related information corresponding to the sensed discharging state is determined and the related information is used as the information related to the first electronic device, in which the related information of the first electronic device is the communication identification of the first electronic device.

S403: receiving and displaying shared information transmitted from the second electronic device to the first electronic device according to the communication identifier.

The shared information is information, which is displayed in a touch control region which corresponds to the first electronic device and is sensed by the second electronic device via the capacitive screen. Specifically, the shared information may be a picture, a text and so on.

When the second electronic device determines that the related information transmitted by the first electronic device is the communication identification, it is indicated that the second electronic device may transmit the shared information to the first electronic device according to the determined communication identification. Specifically, after the second electronic device determines that the related information of the first electronic device is the communication identification, the second electronic device may automatically transmit the shared information to the first electronic device according to the communication identification. Alternatively, the second electronic device may transmit the shared information to the first electronic device according to the communication identification, after receiving a trigger instruction transmitted by the user. These are all reasonable.

After the second electronic device transmits the shared information to the first electronic device according to the communication identification, the first electronic device receives and displays the shared information. In this way, content displayed on the second electronic device may be simultaneously displayed on the first electronic device, thus achieving data exchange between the first electronic device and the second electronic device.

It can be understood that, in the case where the first electronic device is a communication terminal, such as a mobile phone, the communication identifier may be an identification number of the mobile phone, which is used to communicate with another mobile phone. In practical applications, the communication identifier may be a serial number for a SIM card in the mobile phone, i.e. the phone number, or a device identification used in Bluetooth interchange. In the case where the first electronic device is other device, such as PAD, the communication identification may be an inherent physical identification. Moreover, during the transmission of the shared information, the second electronic device may transmit the shared information to a server which is used as a relay device. Then, the server transmits the shared information to the first electronic device corresponding to the communication identifier. Of course, the first electronic device and the second electronic device may be connected to the server respectively. Alternatively, the second electronic device may directly transmit the shared information to the first electronic device corresponding to the communication identification. There are all reasonable.

In this embodiment, the first electronic device transmits the communication identification by using the discharging state of the discharging layer, and the second electronic device determines the communication identification of the first electronic device by using the discharging state sensed by the capacitive screen and transmits the shared information, i.e. the content displayed in the touch control region and sensed by the capacitive screen, to the first electronic device according to the communication identification, so that the data interchange between the electronic devices may be simplified and the user experience is improved.

In the following, a method for processing data according to an embodiment of the invention will be described, with the communication identification of the first electronic device being also the related information of the first electronic device. Of course, the information related to the first electronic device is not limited to the communication identification of the first electronic device and may also be the manufacturer and the type identification of the first electronic device.

It should be noted that the method for processing data according to the embodiment of the invention is applicable to a first electronic device. On a casing of the first electronic device, a discharging layer is arranged. Moreover, the first electronic device operates a data interchange with the second electronic device. The second electronic device has a capacitive screen. Specifically, the first electronic device may be a mobile phone, PAD and so on, on the casing of which the discharging layer is arranged. The discharging layer may be made of conductive rubber, metal and so on. Moreover, the second electronic device may be a mobile phone, PAD and so on with the capacitive screen.

Figure 5:
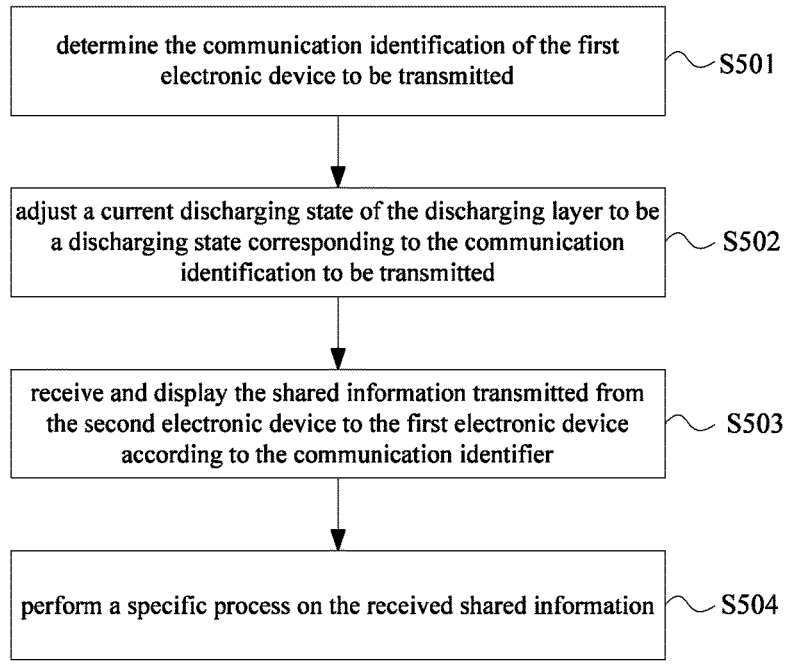
FIG. 5 is a flowchart of a fifth embodiment of the method for processing data according to the invention.

As shown in FIG. 5, a method for processing data may include the following steps S501 to S504.

S501: determining the communication identification of the first electronic device to be transmitted.

S502: adjusting a current discharging state of the discharging layer to be a discharging state corresponding to the communication identification to be transmitted, according to a preset mapping relationship between the related information and the discharging state of the discharging layer.

S503: receiving and displaying shared information transmitted from the second electronic device to the first electronic device according to the communication identifier.

The shared information is information, which is displayed in a touch control region which corresponds to the first electronic device and is sensed by the second electronic device via the capacitive screen.

In this embodiment, the steps S501-S503 are similar to the steps S401-S403 in the above-mentioned embodiment and are not described any more herein.

S504: performing a specific process on the received shared information.

After the shared information transmitted by the second electronic device is received and displayed, a specific process may be performed on the shared information as required by the user. The specific process includes translation, typesetting, zooming in/out and so on. For example, this solution may be applied, in the case where the content displayed on the second electronic device is English and there is no English to Chinese translation software installed in the second electronic device but there is an English to Chinese translation software installed in the first electronic device. Specifically, the first electronic device is placed onto a region to be translated in the second electronic device, and then the first electronic device transmits the communication identification by using the discharging state of the discharging layer. The second electronic device transmits to the first electronic device, according to the determined communication identification, the content displayed in the determined touch control region which corresponds to the first electronic device and then the first electronic device translates the content.

In this embodiment, the first electronic device transmits the communication identification by using the discharging state of the discharging layer. The second electronic device determines the communication identification of the first electronic device by using the discharging state sensed by the capacitive screen and transmits the shared information, i.e. the content displayed in the touch control region sensed by the capacitive screen, to the first electronic device according to the communication identification. The first electronic device receives and displays the shared information and then performs a specific process on the shared information. Therefore, the data interchange between the electronic devices may be simplified and the user experience is improved.

Figure 6:
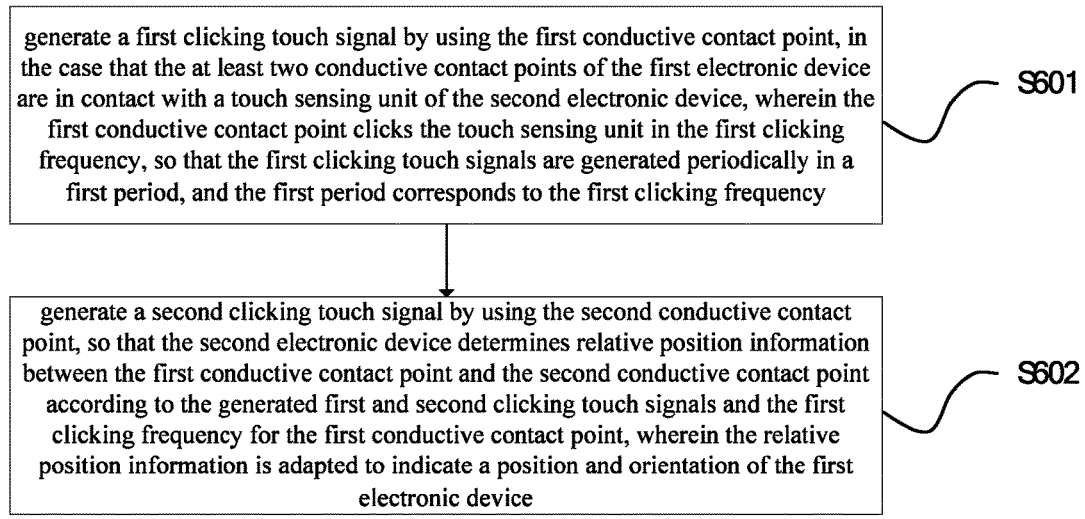
FIG. 6 is a flowchart of a sixth embodiment of the method for processing data according to the invention.

Furthermore, a method according to another embodiment of the present invention may be applied to a first electronic device. The first electronic device has at least two conductive contact points including a first conductive contact point and a second conductive contact point. A first clicking frequency is set for the first conductive contact point, and there is a one-to-one relationship between the first clicking frequency and the first conductive contact point. Referring to FIG. 6, the method includes the following steps S601 to S602.

S601: generating a first clicking touch signal by using a first conductive contact point, when the at least two conductive contact points of a first electronic device are in contact with a touch sensing unit of a second electronic device, wherein the first conductive contact point clicks the touch sensing unit in the first clicking frequency, the first clicking touch signals are generated periodically in a first period, and the first period corresponds to the first clicking frequency.

In the fifth embodiment of the invention, the first electronic device has at least two conductive contact points including the first conductive contact point and the second conductive contact point. The first clicking frequency is set for the first conductive contact point, and there is a one-to-one relationship between the first clicking frequency and the first conductive contact point. When the first and second conductive contact points of the first electronic device are in contact with the touch sensing unit of the second electronic device, the first conductive contact point clicks discontinuously the touch sensing unit of the second electronic device in the first clicking frequency and the first clicking touch signals are generated periodically in the first period. The first period corresponds to the first clicking frequency. Specifically, if the first clicking frequency set for the first conductive contact point is 50 times per second, when the first conductive contact point is in contact with the touch sensing unit of the second electronic device, the first conductive contact point clicks the screen in the frequency of 50 times per second, so as to generate the first clicking touch signal. The first clicking frequency may be set by the system or the user in advance as required. The first clicking frequency is mainly used to distinguish the first conductive contact point and the second conductive contact point, the value of which is not limited thereto.

The skilled in the art may understand that, in other embodiment, three or more conductive contact points, for example a first conductive contact point, a second conductive contact point and a third conductive contact point, may be provided at the first electronic device and a first clicking frequency is set at least for the first conductive contact point. If the distance between two or more conductive contact points is less than a preset distance, distinct clicking frequencies are set for each of the conductive contact points. Specifically, taking three conductive contact points as an example, if the distance among the three conductive contact points is less than 2 cm, distinct clicking frequencies, for example, a first clicking frequency, a second clicking frequency and a third clicking frequency, may be set for each of the three conductive contact points, with the first clicking frequency, the second clicking frequency and the third clicking frequency being different from each other. If the distance between two or more conductive contact points is larger than a preset distance, a clicking frequency may be set at least for one conductive contact point.

S602: generating a second clicking touch signal by using the second conductive contact point, so that the second electronic device determines relative position information between the first conductive contact point and the second conductive contact point according to the generated first and second clicking touch signals and the first clicking frequency for the first conductive contact point, in which the relative position information is adapted to indicate the position and orientation of the first electronic device.

When the first conductive contact point and the second conductive contact point of the first electronic device are in contact with the touch sensing unit of the second electronic device, the second conductive contact point generates the second clicking touch signal.

The generating the second clicking touch signal by using the second conductive contact point may include: generating the second touch signal by using the second conductive contact point continuously. In the case where the clicking frequency is set only for the first conductive contact point, when the second conductive contact point is in contact with the touch sensing unit of the second electronic device, the second conductive contact point continuously presses the touch sensing unit of the second electronic device, so as to generate the second clicking touch signal continuously.

In the case where the second clicking frequency is set for the second conductive contact point, the generating the second clicking touch signal by using the second conductive contact point may include: generating the second clicking touch signal by using the second conductive contact point periodically in the second period, when the second conductive contact point is in contact with the touch sensing unit of the second electronic device. The second period corresponds the second clicking frequency. The second clicking frequency is a clicking frequency preset for the second conductive contact point and is different from the first clicking frequency. Specifically, if the second clicking frequency set for the second conductive contact point is 60 times per second, when the second conductive contact point is in contact with the touch sensing unit of the second electronic device, the second conductive contact point clicks the screen in the frequency of 60 times per second, so as to generate the second clicking touch signal. The second clicking frequency may be set by the system or the user in advance as required and is different from the first clicking frequency.

Correspondingly, the touch sensing unit of the second electronic device may detect the first and second clicking touch signals and determines relative position information between the first conductive contact point and the second conductive contact point according to the generated first and second clicking touch signals and the first clicking frequency for the first conductive contact point, in which the relative position information is adapted to indicate the position and orientation of the first electronic device.

In the present invention, at least two conductive contact points are arranged for the first electronic device. Moreover, a specific clicking frequency is set for at least one of the two conductive contact points. Thereby, the conductive contact points may be distinguished according to different clicking frequencies. Thus, when the at least two conductive contact points of the first electronic device are in contact with the touch sensing unit of the second electronic device, the second electronic device may identify at least one conductive contact point according to the specific clicking frequency and then determine the relative position information of those two conductive contact points according to the position information of the first and second conductive contact points on the touch screen, so as to obtain the position and orientation of the first electronic device. In this method according to the invention, not only the position of the operating body, i.e. the first electronic device, but also the attitude and orientation of the operating body may be identified, so as to provide the user with richer applications.

Figure 7:
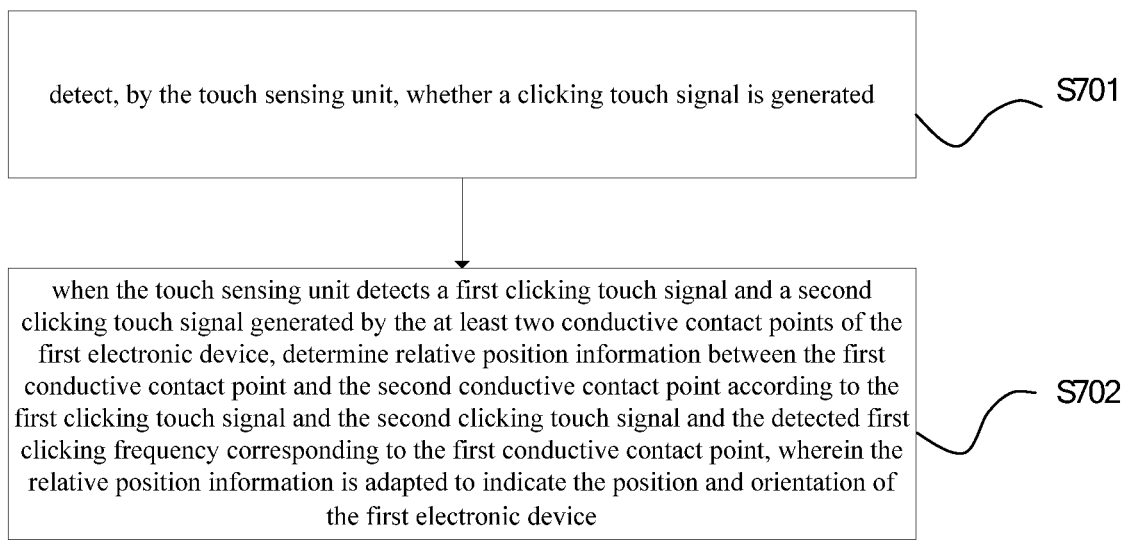
FIG. 7 is a flowchart of a seventh embodiment of the method for processing data according to the invention.

Reference is made to FIG. 7, which is a flowchart of a seventh embodiment of the method for processing data according to the invention.

The method for processing data according to the seventh embodiment of the invention is applicable to the second electronic device. The second electronic device has a touch sensing unit. The method includes the following steps S701-S702.

S701: detecting, by the touch sensing unit, whether a clicking touch signal is generated.

In the seventh embodiment of the invention, the second electronic device has the touch sensing unit. When the at least two conductive contact points of the first electronic device are in contact with the touch sensing unit of the second electronic device, the touch sensing unit detects whether a clicking touch signal is generated.

S702: when the touch sensing unit detects a first clicking touch signal and a second clicking touch signal generated by the at least two conductive contact points of the first electronic device, determining relative position information between the first conductive contact point and the second conductive contact point according to the first clicking touch signal and the second clicking touch signal and the detected first clicking frequency corresponding to the first conductive contact point. The relative position information is adapted to indicate the position and orientation of the first electronic device.

The first electronic device has at least two conductive contact points including the first conductive contact point and the second conductive contact point. The first conductive contact point has the first clicking frequency. There is a one-to-one relationship between the first clicking frequency and the first conductive contact point.

Specifically, when the touch sensing unit detects the first clicking touch signal and the second clicking touch signal, the relative position information between the first conductive contact point and the second conductive contact point is determined according to the first clicking touch signal and the second clicking touch signal and the detected first clicking frequency corresponding to the first conductive contact point.

Specifically, the step S702 may include the following steps S702A to S702C.

S702A: determining first position information of the first conductive contact point and second position information of the second conductive contact point, according to the first clicking touch signal and the second clicking touch signal.

When the touch sensing unit detects the first clicking touch signal and the second clicking touch signal, the first position information of the first conductive contact point and the second position information of the second conductive contact point are determined. Taking the case where the touch sensing unit is a capacitive touch screen as an example, the working principle is as follows. Electrodes are arranged on four sides of the touch screen so that an alternating electric field is formed in a conductive body formed by the electrodes. When the conductive contact point is in contact with the screen, a coupling capacitance is formed between the conductive contact point and the conductive body. When the conductive contact point touches the screen, the coupling capacitance at the touching position may change, and the capacitance may cause a current to flow from the electrode to the contact point. The change of the coupling capacitance leads to a change of the frequency of an oscillator connected to the coupling capacitance. A processor of the touch screen determines the touching position by calculating the current and measuring the change of the frequency. Thus, the first position information of the first conductive contact point and the second position information of the second conductive contact point may be determined.

S702B: identifying the first conductive contact point according to the first clicking frequency and establishing a correspondence between the first conductive contact point and the first position information.

The first conductive contact point clicks the touch sensing unit in the first clicking frequency and the first clicking touch signals are generated periodically in the first period. In the case where no clicking frequency is set for the second conductive contact point, a constant signal is generated, that is, a second clicking touch signal is continuously generated. Thus, the first conductive contact point may be identified according to the first clicking frequency and then the correspondence between the first conductive contact point and the first position information may be established.

S702C: determining the relative position information between the first conductive contact point and the second conductive contact point according to the correspondence between the first conductive contact point and the first position information and the second position information, to acquire the position and orientation of the first electronic device.

When the first conductive touch point is identified, a correspondence between the second conductive contact point and the second position information may be established. The relative position information between the first conductive contact point and the second conductive contact point may be determined according to the correspondence between the first conductive contact point and the first position information and the correspondence between the second conductive contact point and the second position information, so as to acquire the position and orientation of the first electronic device.

In the seventh embodiment of the invention, when the at least two conductive contact points of the first electronic device are in contact with the touch sensing unit of the second electronic device, the touch sensing unit detects whether a clicking touch signal is generated. When the touch sensing unit detects the first clicking touch signal and the second clicking touch signal, the relative position information between the first conductive contact point and the second conductive contact point is determined according to the acquired first and second clicking touch signals and the detected first clicking frequency corresponding to the first conductive contact point, so as to acquire the position and orientation of the first electronic device. In the seventh embodiment of the invention, the second electronic device may identify the positions of the conductive contact points, moreover the second electronic device may determine the relative position relationship between the at least two conductive contact points according to the clicking frequency, so as to determine the orientation and attitude of the first electronic device.

Figure 8:
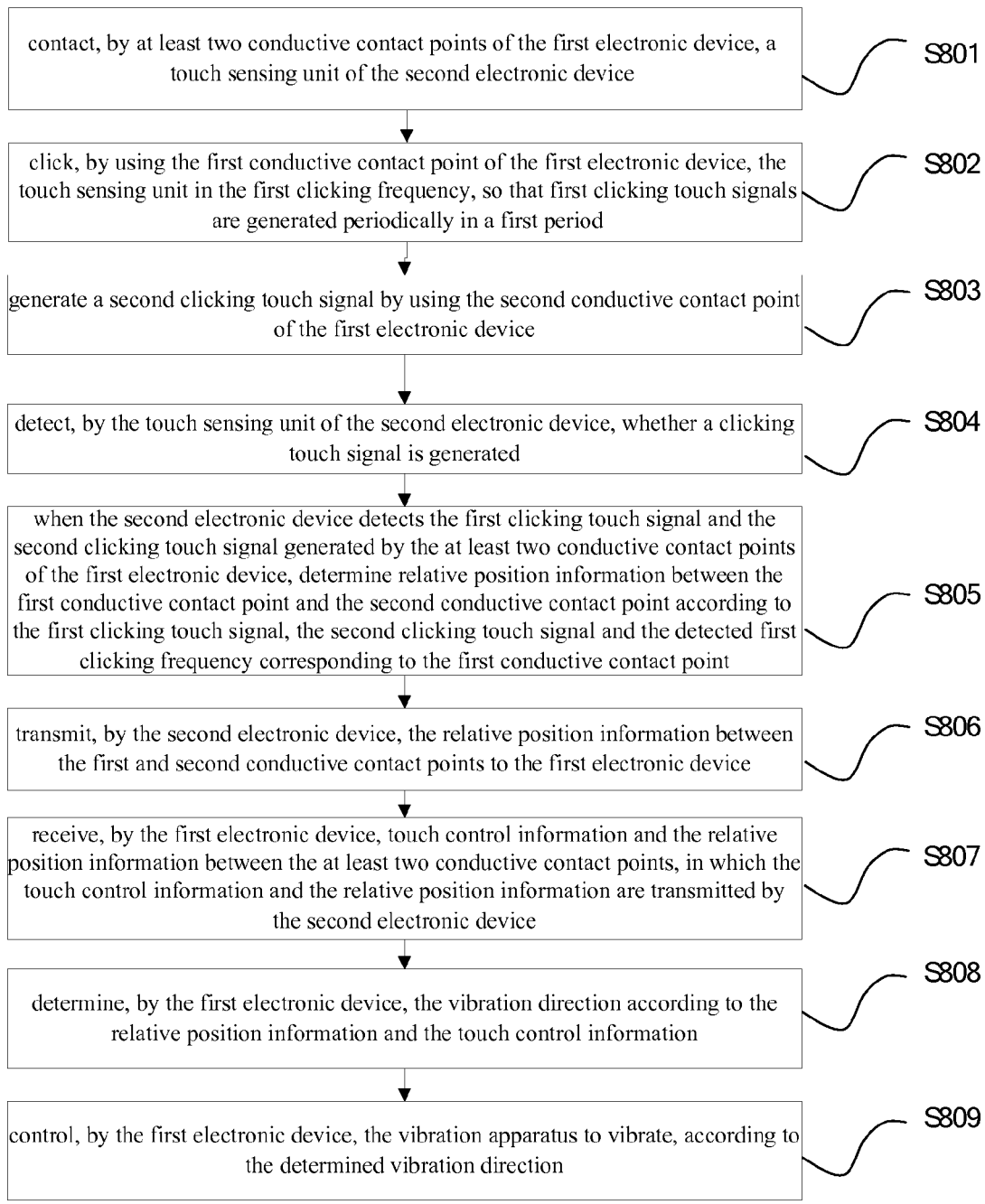
FIG. 8 is a flowchart of an eighth embodiment of the method for processing data according to the invention.

Reference is made to FIG. 8, which is a flowchart of an eighth embodiment of the method for processing data according to the invention.

In this embodiment, the first electronic device is further provided with a vibrating apparatus. The vibrating apparatus may generate a vibration in a corresponding orientation according to the position and orientation of the first electronic device on the second electronic device.

S801: contacting, by at least two conductive contact points of the first electronic device, a touch sensing unit of the second electronic device.

The at least two conductive contact points include a first conductive contact point and a second conductive contact point. A first clicking frequency is set for the first conductive contact point, and there is a one-to-one relationship the first clicking frequency and the first conductive contact point have.

S802: clicking, by using the first conductive contact point of the first electronic device, the touch sensing unit in the first clicking frequency, so that first clicking touch signals are generated periodically in a first period.

The first period corresponds to the first clicking frequency. Specifically, when the first clicking frequency is 50 times per second, the first period is the reciprocal of the first clicking frequency, i.e. 0.02 seconds.

S803: generating a second clicking touch signal by using the second conductive contact point of the first electronic device.

In this embodiment, the first clicking frequency is set only for the first conductive contact point. When the second conductive contact point is in contact with the touch sensing unit, the second conductive contact point continuously presses the touch sensing unit, so as to continuously generate the second clicking touch signal. If the distance between the first conductive contact point and the second conductive contact point is less than a preset distance threshold, for example 2 cm, a second clicking frequency may be set for the second conductive contact point. The second clicking frequency is different from the first clicking frequency, so as to distinguish the first conductive contact point and the second conductive contact point. The preset distance threshold may be set by the system in advance, the value of which is not limited thereto.

S804: detecting, by the touch sensing unit of the second electronic device, whether a clicking touch signal is generated.

Specifically, the touch sensing unit may be a touch screen.

S805: when the second electronic device detects the first and the second clicking touch signals generated by the at least two conductive contact points of the first electronic device, determining relative position information between the first conductive contact point and the second conductive contact point according to the first clicking touch signal, the second clicking touch signal and the detected first clicking frequency corresponding to the first conductive contact point.

Specifically, the second electronic device may acquire the first position information corresponding to the first conductive contact point and the second position information corresponding to the second conductive contact point according to the detected first and second clicking touch signals. Then, the second electronic device may determine the correspondence between the first position information and the first conductive contact point according to the detected first clicking frequency corresponding to the first clicking touch signal. Thus, the first conductive contact point and the second conductive contact point may be distinguished, and the relative position relationship between the first and second conductive contact points may be determined. According to the relative position relationship between the first and second conductive contact points, the orientation of the first electronic device on the screen may be determined.

S806: transmitting, by the second electronic device, the relative position information between the first and second conductive contact points to the first electronic device.

In this embodiment, each of the first electronic device and the second electronic device has a communication unit. The first electronic device and the second electronic device may transmit data via the respective communication units. The communication between the first electronic device and the second electronic device may be established in a wired or wireless way and the invention is not limited thereto.

S807: receiving, by the first electronic device, touch control information and the relative position information between the at least two conductive contact points, in which the touch control information and the relative position information are transmitted by the second electronic device.

In this embodiment, the touch control information may be information related to the vibration direction of the first electronic device. Taking a virtual ice hockey game as an example, in this application, the first electronic device is a handle, and the second electronic device is an electronic device with a touch screen. When a user touches the touch screen by using the handle, the virtual ice hockey is pushed to move. In this case, a feedback force in a direction opposite to that of the movement of the ice hockey is applied to the handle, so that the user obtains a more realistic feel. In the embodiment of the invention, the direction of the movement of the ice hockey is the touch control information. The second electronic device transmits the relative position information of the conductive contact points and the direction of the movement of the ice hockey to the first electronic device, so that the first electronic device determines the vibration direction.

Of course, the touch control information may also be other information. The touch control information is information corresponding to a control signal which is generated by the second electronic device according to the first clicking touch signal and the second clicking touch signal and the relative position relationship therebetween.

S808: determining, by the first electronic device, the vibration direction according to the relative position information and the touch control information.

Specifically, still taking the virtual ice hockey game as an example, the first electronic device may determine the direction of the first electronic device according to the relative position information of the first and second conductive contact points, so as to determine which side of the ice hockey is touched. Then the first electronic device may determine, according to the touch control information (i.e. the direction of the movement of the ice hockey), i.e. a direction which is perpendicular to a connecting line between the first conductive contact point and the second conductive contact point, the vibration direction which is opposite to the direction of the movement of the ice hockey.

The skilled in the art may understand there also is other way to determine the vibration direction, according to different touch control information.

S809: controlling, by the first electronic device, the vibration apparatus to vibrate, according to the determined vibration direction.

In this embodiment, the first electronic device has the vibration apparatus. Specifically, the vibration apparatus may be a vibrating ring. When the vibration direction is determined, the vibration apparatus may be controlled to vibrate in an orientation according to the determined vibration direction.

In the eighth embodiment of the invention, when the first electronic device is placed on the second electronic device having the touch sensing unit for interchange, the position and orientation of the first electronic device on the second electronic device may be determined according to at least two conductive contact points of the first electronic device, so that a feedback force in a corresponding orientation may be applied to the user via the first electronic device, leading to real experience of the user.

Figure 9:
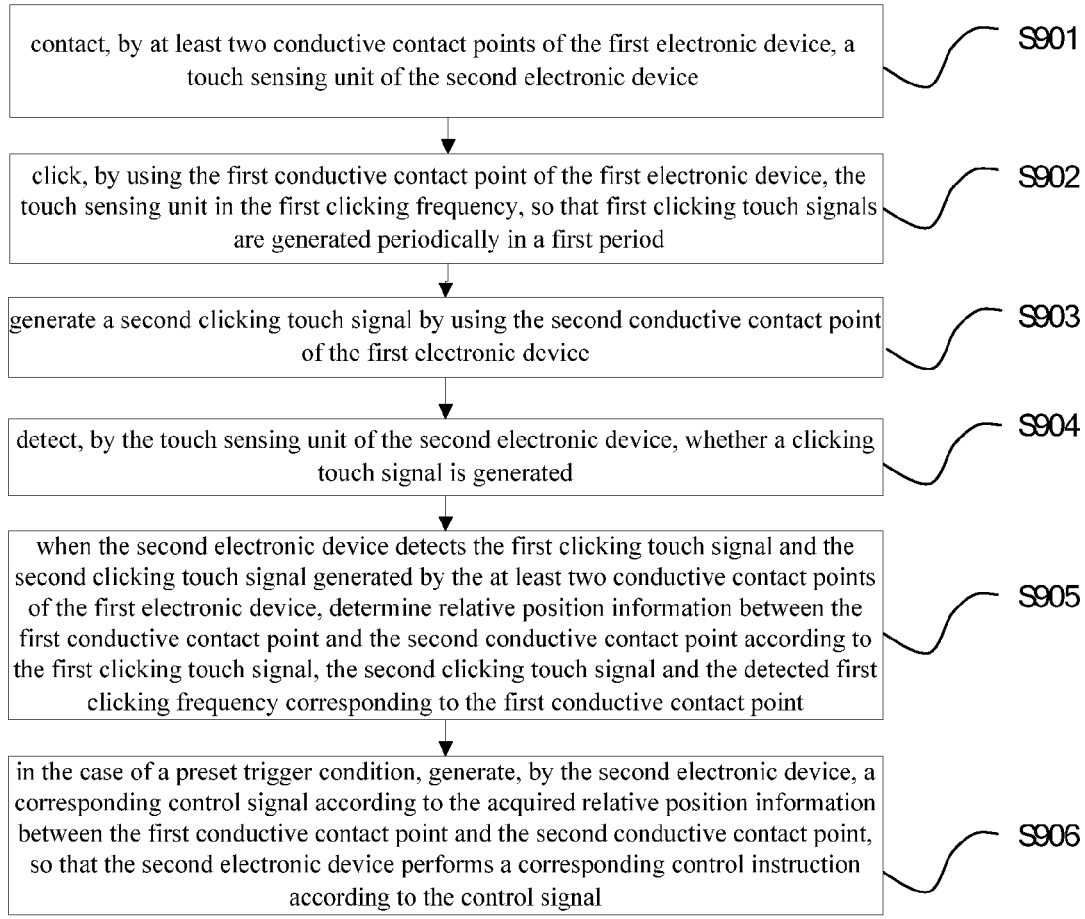
FIG. 9 is a flowchart of a ninth embodiment of the method for processing data according to the invention.

Reference is made to FIG. 9, which is a flowchart of a ninth embodiment of the method for processing data according to the invention.

S901: contacting, by at least two conductive contact points of the first electronic device, a touch sensing unit of the second electronic device.

The at least two conductive contact points include a first conductive contact point and a second conductive contact point. A first clicking frequency is set for the first conductive contact point, and there is a one-to-one relationship between the first clicking frequency and the first conductive contact point.

S902: clicking, by using the first conductive contact point of the first electronic device, the touch sensing unit in the first clicking frequency, so that first clicking touch signals are generated periodically in a first period.

The first period corresponds to the first clicking frequency. Specifically, when the first clicking frequency is 50 times per second, the first period is the reciprocal of the first clicking frequency, i.e. 0.02 seconds.

S903: generating a second clicking touch signal by using the second conductive contact point of the first electronic device.

S904: detecting, by the touch sensing unit of the second electronic device, whether a clicking touch signal is generated.

Specifically, the touch sensing unit may be a touch screen.

S905: when the second electronic device detects the first clicking touch signal and the second clicking touch signal generated by the at least two conductive contact points of the first electronic device, determining relative position information between the first conductive contact point and the second conductive contact point according to the first clicking touch signal, the second clicking touch signal and the detected first clicking frequency corresponding to the first conductive contact point.

S906: in the case of a preset trigger condition, generating, by the second electronic device, a corresponding control signal according to the acquired relative position information between the first conductive contact point and the second conductive contact point, so that the second electronic device performs a corresponding control instruction according to the control signal.

Specifically, the second electronic device generates a corresponding control signal according to the acquired relative position information between the first conductive contact point and the second conductive contact point. Taking the virtual table tennis game as an example, in this application, the first electronic device is a handle, and the second electronic device is an electronic device with a touch screen. In the case that a user hits a virtual table tennis by using the handle, when the contact surfaces between the handle and the virtual table tennis during the hitting are different, forces applied to the virtual table tennis are different correspondingly. For example, assuming that the side A of the handle is a side facing the user when the conductive contact point A is located on the left side of the conductive contact point B, the acting force applied to the virtual table tennis when the virtual table tennis is hit by the side A of the handle is set to be larger than that when the virtual table tennis is hit by the side B of the handle. The second electronic device determines whether the side A or the side B of the handle hits the virtual table tennis according to the relative position information between the first conductive contact point and the second conductive contact point, and thus generates a different acting force to control the speed and direction of the movement of the virtual table tennis.

In another example, the first electronic device is a mobile terminal, such as a mobile phone, and the second electronic device is a device with a touch sensing unit, such as a PAD. Two conductive contact points A and B may be arranged in advance on one side of the mobile phone (for example, the mobile phone has a long side and a short side, and the two conductive contact points may be arranged on the long side). The clicking frequency for the conductive contact point A is set to be 50 times per second. When the conductive contact point A is located on the left side of the conductive contact point B, the screen of the mobile phone faces the user; and when the conductive contact point A is located on the right side of the conductive contact point B, the screen of the mobile phone is back against the user. The user may place the mobile phone so that the long side of the mobile phone is in contact with the PAD. It may be set in advance that, when the Pad detects the clicking touch signal and the positions of the two clicking touch signals are used as the boundary, a file located on one side of the boundary is deleted and a file located on the other side of the boundary is copied. In this case, on which side the deleting operation is performed and on which side the copying operation is performed are determined according to the orientation of the mobile phone on the screen of the PAD. For example, it may be set in advance that on the side facing the screen of the mobile phone the copying operation is performed and on the side back against the screen of the mobile phone the deleting operation is performed. Therefore, the second electronic device may determine relative position relationship between the first conductive contact point A and the second conductive contact point B according to the acquired clicking touch signals generated by using the conductive contact point A and the conductive contact point B and the clicking frequency for the conductive contact point A, so as to generate a control signal for controlling the second electronic device to perform a corresponding operation. The control signal is not limited to the signal for performing the file deleting or updating operation and may be other control signal and control instruction. This example is only one of the embodiments of the invention and is only for illustration of one embodiment and should not be considered as limiting the embodiments of the invention.

In the ninth embodiment of the invention, the second electronic device may determine the relative position relationship between the first clicking touch signal and the second clicking touch signal according to the acquired first and second clicking touch signals and the first clicking frequency, and then determine the position and orientation of the first electronic device, so as to generate a corresponding control instruction for controlling the second electronic device to perform the control instruction. In this embodiment, the second electronic device generates different control instructions according to different orientations and attitudes of the first electronic device, so as to provide the user with a more extensive application.

It should be noted that, the sixth, seventh, eighth and ninth embodiments of the present invention are all described by taking the case where the first electronic device has two electrically conductive contact points, i.e. the first and second conductive contact points, as an example. However, the skilled in the art may understand that the first electronic device may be provided with three or more conductive contact points as required and the above-mentioned embodiments are also applicable to the case where the first electronic device has three or more conductive contact points. Furthermore, the step of setting a clicking frequency for at least one conductive contact point includes: setting a clicking frequency for one conductive contact point and setting different clicking frequencies for multiple conductive contact points.

Figure 10:
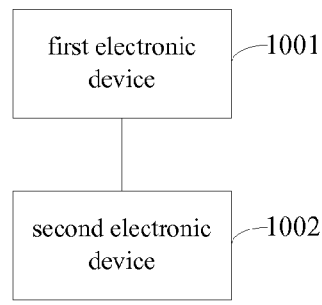
FIG. 10 is a schematic view of a system for processing data according to the invention.

According to another aspect of the invention, as shown on FIG. 10, there is provided a system for processing data, including:

a first electronic device 1001 having a touch module, in which the touch module of the first electronic device 1001 generates touch information of the first electronic device 1001, in the case that the first electronic device 1001 is in contact with a second electronic device 1002; and the second electronic device 1002 adapted to determine related information of the first electronic device 1001, according to the touch information of the first electronic device 1001.

Figure 11:
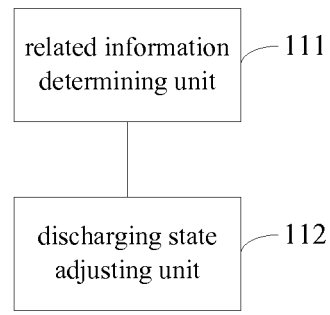
FIG. 11 is a schematic view of an embodiment of a first electronic device in the system for processing data according to the invention.

In the following, referring to FIG. 11, an embodiment of the first electronic device in the above-mentioned system for processing data is provided. On a casing of the first electronic device, a discharging layer arranged. The system for processing data may include a related information determining unit 111 and a discharging state adjusting unit 112.

The related information determining unit 111 is adapted to determine related information of the first electronic device to be transmitted, when the first electronic device is placed on a capacitive screen of the second electronic device.

The discharging state adjusting unit 112 is adapted to adjust a current discharging state of the discharging layer to be a discharging state corresponding to the related information to be transmitted, according to a preset mapping relationship between the related information and the discharging state of the discharging layer, so that the second electronic device determines the related information corresponding to the first electronic device according to the discharging state of the first electronic device sensed by the capacitive screen.

In the system for processing data according to the embodiment of the invention, when the first electronic device is placed on the capacitive screen of the second electronic device and the discharging layer is arranged on the casing of the first electronic device, the first electronic device firstly determines the related information of the first electronic device to be transmitted and then adjusts the discharging state of the discharging layer to be the discharging state corresponding to the related information to be transmitted, according to the preset mapping relationship between the related information and the discharging state of the discharging layer, so that the second electronic device determines the related information of the first electronic device according to the discharging state of the first electronic device sensed by the capacitive screen. It can be seen in this solution that the first electronic device transfers the related information by using the discharging state of the discharging layer, and the second electronic device determines the related information by using the eclectic discharging state sensed by the capacitive screen, so that the data interchange between the electronic devices may be simplified and the user experience is improved.

Specifically, the related information determining unit 111 may be adapted to determine a communication identification of the first electronic device. The skilled in the art may understand that the related information determining unit 111 may also be adapted to determine a physical identification, a type identification, a manufacturer and so on of the first electronic device. These are all reasonable.

Specifically, the discharging state adjusting unit 112 may be adapted to adjust a current discharging state of the discharging layer to be a discharging state corresponding to the related information to be transmitted, according to a preset mapping relationship between the related information and the discharging state of the discharging layer.

Figure 12:
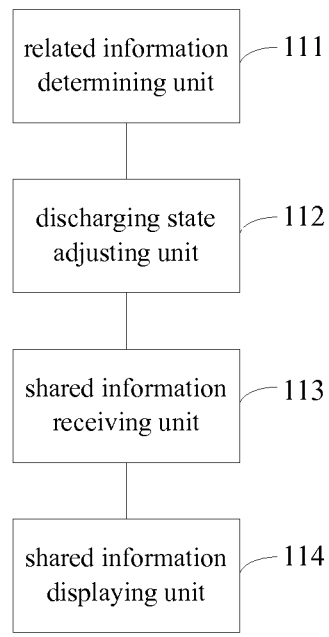
FIG. 12 is a schematic view of another embodiment of the first electronic device in the system for processing data according to the invention.

Furthermore, as shown in FIG. 12, the first electronic device according to another embodiment of the invention may further include a shared information receiving unit 113 and a shared information displaying unit 114.

The shared information receiving unit 113 is adapted to receive shared information transmitted from the second electronic device to the first electronic device according to the communication identification, in which the shared information is information displayed in a touch control region which corresponds to the first electronic device and the shared information is sensed by the second electronic device via a capacitive screen.

The shared information displaying unit 114 is adapted to display the shared information.

Figure 13:
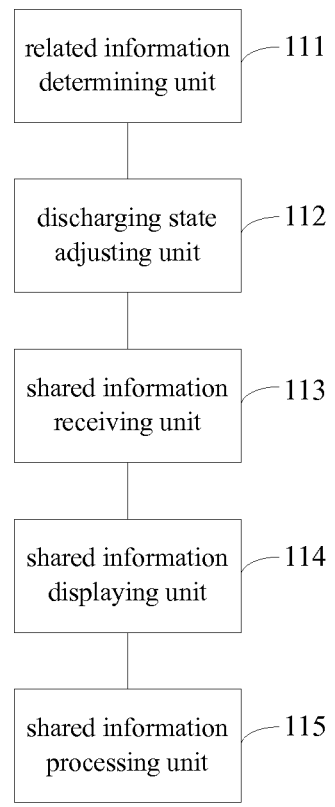
FIG. 13 is a schematic view of yet another embodiment of the first electronic device in the system for processing data according to the invention.

Furthermore, as shown in FIG. 13, the first electronic device according to yet another embodiment of the invention may further include a shared information processing unit 115.

The shared information processing unit 115 is adapted to perform a specific process on the received shared information.

Figure 14:
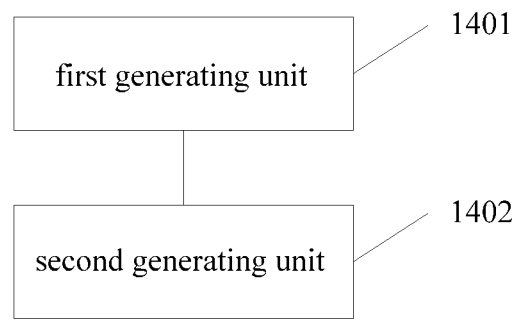
FIG. 14 is a schematic view of still another embodiment of the first electronic device in the system for processing data according to the invention.

Reference is made to FIG. 14 which is a schematic view of still another embodiment of the first electronic device according to the invention.

The embodiment of the invention provides a first electronic device having at least two conductive contact points which include a first conductive contact point and a second conductive contact point. A first clicking frequency is set for the first conductive contact point. There is a one-to-one relationship between the first clicking frequency and the first conductive contact point. The first electronic device includes a first generating unit 1401 and a second generating unit 1402.

The first generating unit 1401 is adapted to generate a first clicking touch signal by using the first conductive contact point, in the case that the first conductive contact point of the first electronic device is in contact with a touch sensing unit of the second electronic device. The first conductive contact point clicks the touch sensing unit in the first clicking frequency, so that the first clicking touch signals are generated periodically in a first period, and the first period corresponds to the first clicking frequency.

The second generating unit 1402 is adapted to generate a second clicking touch signal by using the second conductive contact point, in the case that the second conductive contact point of the first electronic device is in contact with the touch sensing unit of the second electronic device, so that the second electronic device determines relative position information between the first conductive contact point and the second conductive contact point according to the generated first and second clicking touch signals and the first clicking frequency for the first conductive contact point. The relative position information is adapted to indicate the position and orientation of the first electronic device.

Specifically, the second generating unit is adapted to generate the second clicking touch signals continuously by using the second conductive contact point, when the second conductive contact point of the first electronic device is in contact with the touch sensing unit of the second electronic device.

Specifically, the second generating unit is adapted to generate the second clicking touch signals by using the second conductive contact point periodically in a second period, when the second conductive contact point of the first electronic device is in contact with the touch sensing unit of the second electronic device. The second period corresponds to a second clicking frequency which is a clicking frequency preset for the second conductive contact point. The second clicking frequency is different from the first clicking frequency.

Furthermore, the first electronic device has a vibrating apparatus, and the first electronic device further includes: a receiving unit, a determining unit and a first control unit.

The receiving unit is adapted to receive touch control information and the relative position information between the at least two conductive contact points transmitted by the second electronic device.

The determining unit is adapted to determine a vibration direction according to the relative position information and the touch control information.

The first control unit is adapted to control the vibrating apparatus to vibrate according to the determined vibration direction.

Furthermore, distinct clicking frequencies are set for each of the conductive contact points, when the distance between the conductive contact points is smaller than a preset distance.

Figure 15:
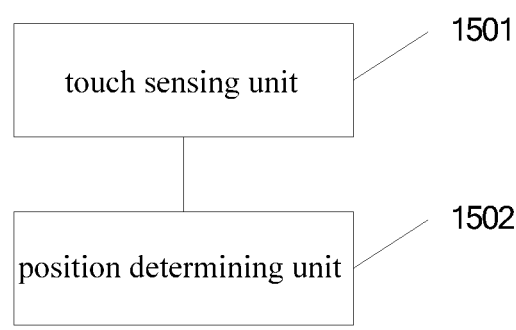
FIG. 15 is a schematic view of an embodiment of a second electronic device in the system for processing data according to the invention.

Reference is made to FIG. 15 which is a schematic view of an embodiment of a second electronic device according to the invention A second electronic device is provided according to the embodiment of the invention. The second electronic device may include: a touch sensing unit 1501 and a position determining unit 1502.

The touch sensing unit 1501 is adapted to detect whether a clicking touch signal is generated.

The position determining unit 1502 is adapted to, when the touch sensing unit detects a first clicking touch signal and a second clicking touch signal generated by the at least two conductive contact points of the first electronic device, determine relative position information between the first conductive contact point and the second conductive contact point according to the first clicking touch signal and the second clicking touch signal and the detected first clicking frequency corresponding to the first conductive contact point. The relative position information is adapted to indicate the position and orientation of the first electronic device.

The first electronic device has at least two conductive contact points which include a first conductive contact point and a second conductive contact point. A first clicking frequency is set for the first conductive contact point. There is a one-to-one relationship between the first clicking frequency and the first conductive contact point.

The position determining unit includes: a first acquiring unit, a correspondence establishing unit and a second acquiring unit.

The first acquiring unit is adapted to determine first position information corresponding to the first conductive contact point and second position information corresponding to the second conductive contact point, according to the first clicking touch signal and the second clicking touch signal.

The correspondence establishing unit is adapted to identify the first conductive contact point according to the first clicking frequency and establish correspondence between the first conductive contact point and the first position information.

The second acquiring unit is adapted to determine the relative position information between the first conductive contact point and the second conductive contact point according to the correspondence between the first conductive contact point and the first position information and the second position information, to acquire the position and orientation of the first electronic device.

Furthermore, the second electronic device further includes: a transmitting unit adapted to transmit the relative position information between the first conductive contact point and the second conductive contact point to the first electronic device.

Furthermore, the second electronic device further includes: a second control unit adapted to, in the case where a preset trigger condition is met, generate a corresponding control signal according to the acquired relative position information between the first conductive contact point and the second conductive contact point, so that the second electronic device performs a corresponding control instruction according to the control signal.

The embodiments of the apparatus and system substantially correspond to the embodiments of the method. Therefore, relevant portions may be referred to the description for the portions of the embodiments of the method. The above-described embodiments of the apparatus and system are merely illustrative. A unit described as a separated part may be or may not be physically separated. A part shown in a unit may be or may not be a physical unit, i.e. a part shown in a unit may be located in one place or may be distributed to multiple network units. A part or all of the modules may be chosen as required to achieve the object of the present embodiment plan. The skilled in the art may understand and implement the invention without creative work.

It should be understood that, in the several embodiments according to the invention, the disclosed system, apparatus and method may be implemented in other way without departing from the spirit and scope of the invention. The given embodiments are only exemplary examples and should not be considered as limitation. The given specific details should not be considered as limiting the object of the application. For example, the division for the units or sub-units is only based on a logic function. There may be other way to divide in actual implement. For example, multiple units or multiple sub-units are combined together. In addition, multiple units or components may be combined or integrated into another system, or some features may be omitted or not be implemented.

In addition, the described system, apparatus and method as well as schematic views of different embodiments may be combined or integrated with other system, module, technique or method, without departing from the scope of the application. Moreover, the illustrated or discussed mutual coupling or direct coupling or communication connection may be indirect coupling or communication connection via some interfaces, apparatuses or units, and may be electrical, mechanical or of other form.

Those described above are only embodiments of the present invention. It should be noted that, for the skilled in the art, improvements and modifications may also be made without departing from the principle of the invention. Those improvements and modifications should also be included in the scope of protection of the present invention.

The invention claimed is:

1. A method for processing data, comprising:
generating, by a touch module of a first electronic device, touch information of the first electronic device, in a case that the first electronic device is in contact with a touch screen of a second electronic device, wherein the touch information carries related information of the first electronic device; and
transferring, by the first electronic device, the touch information of the first electronic device to the touch screen of the second electronic device, wherein the second electronic device (i) receives the touch information of the first electronic device via the touch screen of the second electronic device, and (ii) determines the related information of the first electronic device according to the received touch information of the first electronic device,
wherein the touch module comprises a first conductive contact point and a second conductive contact point,
wherein the generating, by the touch module of the first electronic device, the touch information of the first electronic device comprises:
generating a first clicking touch signal by using the first conductive contact point and generating a second clicking touch signal by using the second conductive contact point, when both the first conductive contact point and the second conductive contact point are in contact with the touch screen of the second electronic device, wherein the first clicking touch signal has a first clicking frequency; and
wherein the transferring, by the first electronic device, the touch information of the first electronic device to the touch screen of the second electronic device comprises:
transmitting, by the first electronic device, the first clicking touch signal and the second clicking touch signal simultaneously through the contacts between the first conductive contact point of the first electronic device and the touch screen of the second electronic device and between the second conductive contact point of the first electronic device and the touch screen of the second electronic device.

2. The method according to claim 1, wherein the touch module comprises a discharging layer arranged on a casing of the first electronic device.

3. The method according to claim 2, further comprising:
before generating, by a touch module of the first electronic device, touch information of the first electronic device, determining the related information of the first electronic device,
wherein the generating, by a touch module of the first electronic device, touch information of the first electronic device further comprises adjusting a current discharging state of the discharging layer to be a discharging state corresponding to the related information to be transmitted, according to a preset mapping relationship between the related information and the discharging state of the discharging layer.

4. The method according to claim 3, wherein the related information of the first electronic device comprises a communication identification of the first electronic device.

5. The method according to claim 4, further comprising:
receiving and displaying shared information transmitted from the second electronic device to the first electronic device according to the communication identification, wherein the shared information is information displayed in a touch control region which corresponds to the first electronic device and the shared information is sensed by the second electronic device via a capacitive screen; and
performing a specific process on the received shared information.

6. The method according to claim 1, wherein there is a one-to-one relationship between the first clicking frequency and the first conductive contact point.

7. The method according to claim 6,
wherein the second electronic device determines relative position information between the first conductive contact point and the second conductive contact point according to the generated first and second clicking touch signals and the first clicking frequency for the first conductive contact point, and the relative position information is adapted to indicate a position and orientation of the first electronic device.

8. The method according to claim 7, wherein the generating a second clicking touch signal by using the second conductive contact point comprises:
generating the second clicking touch signals continuously by using the second conductive contact point.

9. The method according to claim 7, wherein the generating a second clicking touch signal by using the second conductive contact point comprises:
generating the second clicking touch signals by using the second conductive contact point periodically in a second period, wherein the second period corresponds to a second clicking frequency which is a preset clicking frequency for the second conductive contact point, and the second clicking frequency is different from the first clicking frequency.

10. The method according to claim 7, wherein the first electronic device comprises a vibrating apparatus, and the method further comprises:
receiving touch control information and the relative position information between the at least two conductive contact points transmitted by the second electronic device;
determining a vibration direction according to the relative position information and the touch control information; and
controlling the vibrating apparatus to vibrate according to the determined vibration direction.

11. The method according to claim 7, wherein a clicking frequency is set for the second conductive contact point, which is different from the clicking frequency set for the first conductive contact point, in a case that a distance between the first conductive contact point and the second conductive contact point is smaller than a preset distance.

12. A system for processing data, comprising:
a first electronic device having a touch module,
wherein:
the first electronic device determines whether the first electronic device is in contact with a touch screen of a second electronic device;
the touch module of the first electronic device generates touch information of the first electronic device, in a case that the first electronic device is in contact with the touch screen of the second electronic device;
the first electronic device transfers the generated touch information of the first electronic device to the touch screen of the second electronic device;
the touch information carries related information of the first electronic device;
the touch module comprises a first conductive contact point and a second conductive contact point;
the touch module of the first electronic device generates (i) a first clicking touch signal by using the first conductive contact point, and (ii) a second clicking touch signal by using the second conductive contact point, when both the first conductive contact point and the second conductive contact point are in contact with the touch screen of the second electronic device;
the first clicking touch signal has a first clicking frequency; and
the first electronic device transmits the first clicking touch signal and the second clicking touch signal to the touch screen of the second electronic device simultaneously through the contacts between the first conductive contact point of the first electronic device and the touch screen of the second electronic device and between the second conductive contact point of the first electronic device and the touch screen of the second electronic device; and
the second electronic device having the touch screen, and adapted to receive the touch information of the first electronic device by the touch screen and determine the related information of the first electronic device according to the received touch information of the first electronic device.

13. The system according to claim 12, wherein the touch module comprises a discharging layer arranged on a casing of the first electronic device.

14. The system according to claim 13, wherein the first electronic device further comprises:
a related information determining module adapted to determine the related information of the first electronic device to be transmitted, in the case that the first electronic device is placed on a capacitive screen of the second electronic device; and
a discharging state adjusting module adapted to adjust a current discharging state of the discharging layer to be a discharging state corresponding to the related information to be transmitted, according to a preset mapping relationship between the related information and the discharging state of the discharging layer, wherein the second electronic device determines the related information corresponding to the first electronic device according to the discharging state of the first electronic device sensed by the capacitive screen.

15. The system according to claim 14, wherein the first electronic device further comprises:
   a shared information receiving unit adapted to receive shared information transmitted from the second electronic device to the first electronic device according to a communication identification, wherein the shared information is information displayed in a touch control region which corresponds to the first electronic device and the shared information is sensed by the second electronic device via a capacitive screen;
   a shared information displaying unit adapted to display the shared information; and
   a shared information processing unit adapted to perform a specific process on the received shared information.

16. The system according to claim 14, wherein the discharging state adjusting module is adapted to adjust a quantity of electric charges released by the discharging layer to be a quantity of electric charges corresponding to the related information to be transmitted, according to a preset mapping relationship between the related information and the quantity of electric charges released by the discharging layer.

17. The system according to claim 12, wherein there is a one-to-one relationship between the first clicking frequency and the first conductive contact point.

18. The system according to claim 17, wherein:
   the second electronic device determines relative position information between the first conductive contact point and the second conductive contact point according to the generated first and second clicking touch signals and the first clicking frequency for the first conductive contact point, and
   the relative position information is adapted to indicate a position and orientation of the first electronic device.

19. The system according to claim 18, wherein the touch module is adapted to:
   generate the second clicking touch signal continuously by using the second conductive contact point, in a case that the second conductive contact point of the first electronic device is in contact with the touch screen of the second electronic device.

20. The system according to claim 18, wherein the touch module is adapted to:
   generate the second clicking touch signal by using the second conductive contact point periodically in a second period, in a case that the second conductive contact point of the first electronic device is in contact with the touch screen of the second electronic device, wherein the second period corresponds to a second clicking frequency which is a preset clicking frequency for the second conductive contact point, and the second clicking frequency is different from the first clicking frequency.

21. The system according to claim 18, wherein the first electronic device further comprises:
   a vibrating apparatus;
   a receiving unit adapted to receive touch control information and the relative position information between the at least two conductive contact points transmitted by the second electronic device;
   a determining unit adapted to determine a vibration direction according to the relative position information and the touch control information; and
   a first control unit adapted to control the vibrating apparatus to vibrate according to the determined vibration direction.

22. The system according to claim 18, wherein a clicking frequency is set for the second conductive contact point, which is different from the clicking frequency set for the first conductive contact point, in a case that a distance between the first conductive contact point and the second conductive contact point is smaller than a preset distance.

23. The system according to claim 17, wherein the second electronic device comprises:
   a touch sensing unit adapted to detect whether a clicking touch signal is generated; and
   a position determining unit adapted to, in a case that the touch sensing unit detects a first clicking touch signal and a second clicking touch signal generated by the at least two conductive contact points of the first electronic device, determine relative position information between the first conductive contact point and the second conductive contact point according to the first clicking touch signal and the second clicking touch signal and a detected first clicking frequency corresponding to the first conductive contact point, wherein the relative position information is adapted to indicate a position and orientation of the first electronic device.

24. The system according to claim 23, wherein the position determining unit comprises:
   a first acquiring unit adapted to determine first position information corresponding to the first conductive contact point and second position information corresponding to the second conductive contact point, according to the first clicking touch signal and the second clicking touch signal;
   a correspondence establishing unit adapted to identify the first conductive contact point according to the first clicking frequency and establish correspondence between the first conductive contact point and the first position information; and
   a second acquiring unit adapted to determine the relative position information between the first conductive contact point and the second conductive contact point according to the correspondence between the first conductive contact point and the first position information and the second position information, to acquire the position and orientation of the first electronic device.

25. The system according to claim 23, wherein the second electronic device comprises:
   a transmitting unit adapted to transmit the relative position information between the first conductive contact point and the second conductive contact point to the first electronic device; and a second control unit adapted to, in a case of a preset trigger condition, generate a corresponding control signal according to the determined relative position information between the first conductive contact point and the second conductive contact point, wherein the second electronic device performs a corresponding control instruction according to the control signal.

* * * * *